Oct. 19, 1948.  A. E. ANDERSON  2,451,464
RECORDER
Original Filed Sept. 8, 1943

2 Sheets—Sheet 1

INVENTOR.
Albert E. Anderson
BY
ATTORNEY.

Oct. 19, 1948.  A. E. ANDERSON  2,451,464
RECORDER
Original Filed Sept. 8, 1943  2 Sheets-Sheet 2
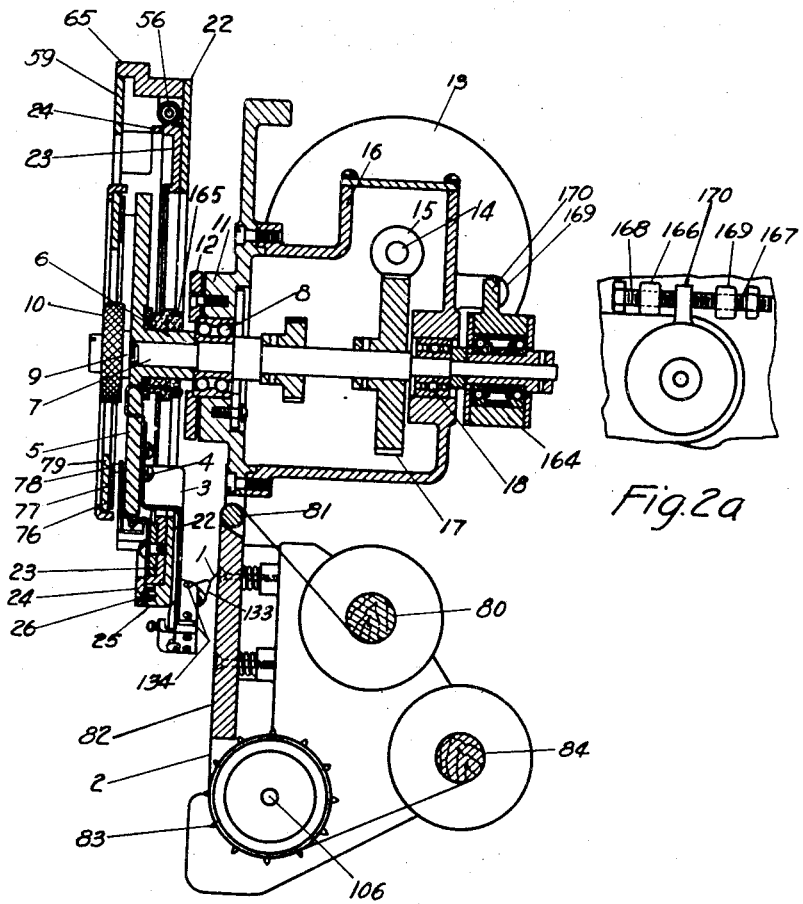
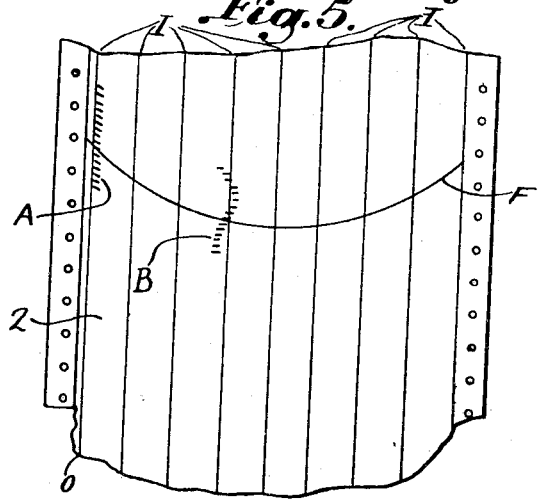
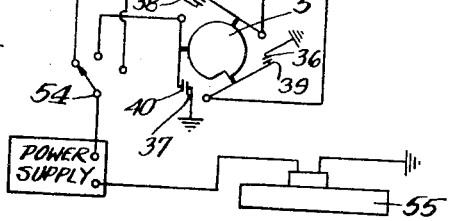
INVENTOR.
Albert E. Anderson
BY
his ATTORNEY Patented Oct. 19, 1948

2,451,464

UNITED STATES PATENT OFFICE 2,451,464

RECORDER

Albert E. Anderson, Holbrook, Mass., assignor, by mesne assignments, to Submarine Signal Company, Boston, Mass., a corporation of Delaware Original application September 8, 1943, Serial No. 501,727. Divided and this application September 15, 1945, Serial No. 616,579

2 Claims. (Cl. 346—34)

The present application is a division of application Serial No. 501,727, filed September 8, 1943.

The present invention relates to recording apparatus particularly for recording short time intervals. Still more particularly the present invention relates to recorders for echo distance measurement in which the time interval between the transmission of a wave impulse and the receipt of a reflected impulse is used as a measure of the distance.

In echo depth sounding a compressional wave impulse is transmitted into the water and the impulse reflected from the ocean or river bottom, as the case may be, is received and caused to effect a marking of a record paper by a stylus which is moved at a uniform speed over the paper.

The object of this invention is the provision of an arrangement whereby a so-called "fix" mark can be made across the record paper at any desired instant, for example, when the ship crosses a predetermined position.

Figure 1:
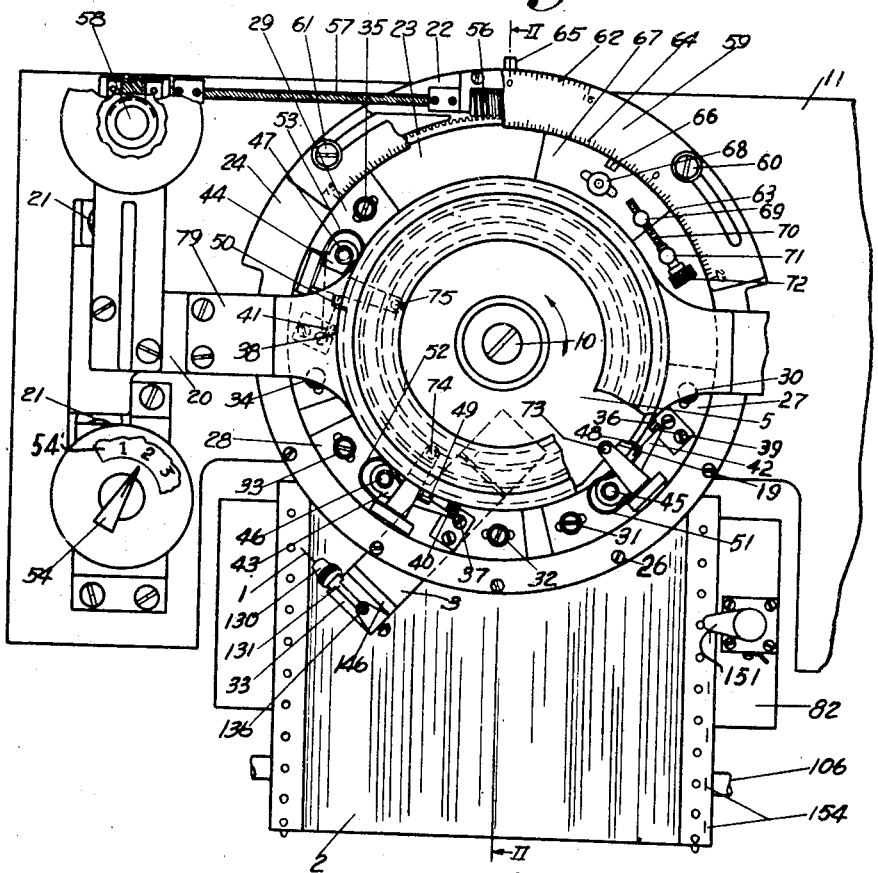
Figure 3:
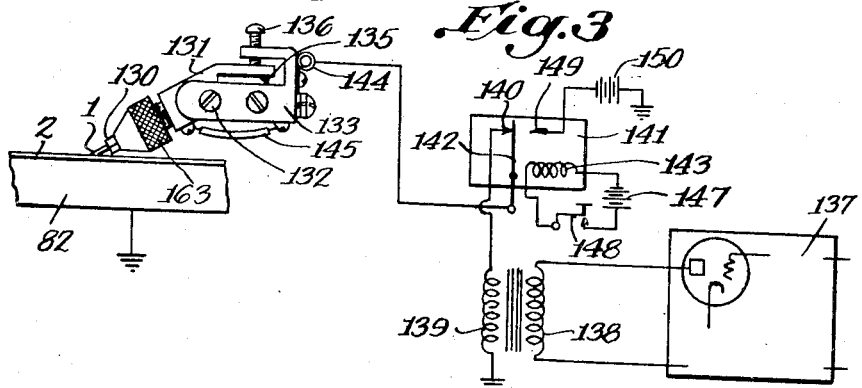

The above and other features of the present invention will best be understood from the following description taken in connection with the accompanying drawings in which Fig. 1 represents a front elevation of my recording instrument broken away in parts; Fig. 2 is a vertical section taken along the line II—II in Fig. 1; Fig. 2a is a partial back elevation of the same device; Fig. 3 shows in elevation the recording stylus holder as well as a circuit diagram of the arrangement for producing fix marks; Fig. 4 shows a schematic diagram of the signal impulse transmitting circuit; and Fig. 5 illustrates a record as made by the recording instrument.

Referring, first, to Figs. 1 and 2, a recording stylus 1 is arranged to move rapidly at a constant speed over a record paper 2. The stylus is mounted on an arm 3 fixed by screws 4 to a cam 5 which is provided with a central hub 6 by which the cam is mounted on a shaft 7. The cam is held in place on the shaft by ball bearings 8 on the one side and by the shoulder 9 of a knob 10 on the other side. The ball bearing 8 is supported in a fixed frame 11 in which it is held in position by the retaining ring 12. A constant speed motor 13 is also mounted on the frame. The motor shaft 14 carries a worm 15 within a gear box 16 where the worm meshes with gear 17 fixed to the shaft 7. The shaft 7 is further supported by ball bearings 18 mounted in the gear box casing. By this arrangement the cam 5 and therefore the stylus 1 can be rotated at a constant speed. The cam 5 is substantially circular except for a small cutaway portion 19 as shown in Fig. 1 whereby the impulse transmitting contacts are operated. A bracket 20 is fixed to the frame 11 as by screws 21. This bracket is in the form of a yoke having a central ring-shaped portion 22 which is concentric with the shaft 7. Upon the ring 22 there is mounted a ring gear 23 which is held in place by a retaining ring 24 fastened by screws 26 to an outwardly extending flange 25 formed in the ring 22. To the ring gear there are mounted a plurality of contact-carrying arcuate segments, three of which are shown as 27, 28 and 29. These are fastened to the gear 23 by the screws 30 to 35. The holes through which these screws pass are elongated whereby the angular positions of the arcuate members 27 to 29 can be adjusted. The members 27 to 29 carry fixed contacts 36 to 38, respectively, and movable contacts 39 to 41, respectively. The movable contacts are mounted on arms 42 to 44 pivoted on the members 27 to 29 at 45, 46 and 47. The arms 42 to 44 are provided with cam followers 48 to 50, respectively, which are urged against the cam by the springs 51 to 53. While the cam followers are on the high portions of the cam 5, the several sets of contacts are open but as the cut-away portion of the cam 5 reaches each of the cam followers 48 to 50 its contacts close. It will be noted that the cut in the cam is radial at the leading edge; hence the contacts are closed very rapidly and wear of the cam does not affect the timing.

The contacts are connected in circuit with the signal impulse transmitter, for example, an underwater compressional wave transmitter 55 as shown in Fig. 4. Interposed in the circuit is a selector switch 54 whereby any one of the three sets of contacts can be selected for the operation of the transmitter 55. Therefore, although each set of contacts is closed once in each rotation of the cam 5, nevertheless only one set of contacts is effective to operate the transmitter depending upon the position of the switch 54. By this means different depth ranges can be recorded, the position of the switch 54 indicating which section of said range has been selected. The selector switch 54 has a pointer at one end which points to the position indicating sector 54' on which the different positions such as 1, 2 and 3 may be indicated.

Since the position of the ring gear 23 on which the contacts are mounted must be adjustable, as will hereafter appear, the movable contacts 39, 40 and 41 are insulated from the rest of the apparatus and are connected by brushes 73, 74 and 75 to slip rings 76, 77 and 78, respectively, which are mounted on a second yoke 79 fastened to the yoke 20. These slip rings (omitted from Fig. 4 for simplicity) are connected to the three contact studs of the selector switch 54. The stationary contacts 36, 37 and 38 may be grounded to the frame.

Now, it is important that the transmitted signal impulse be sent out at precisely the instant when the stylus 1 is at the correct angular position with respect to the depth graduations on the chart. For the first depth range, that is from zero to, say, 75 feet, the cam follower 48 must drop into the cam depression 19 and thereby close the contacts 36, 39 at precisely the instant the stylus 1 crosses the zero line. In order to make a convenient adjustment for this purpose, the ring gear 23 is engaged by a worm 56 which can be rotated through the flexible shaft 57 by rotating the knob 58. By turning this knob the relative position of the contacts 36, 39 with respect to a predetermined position of the stylus is changed. Thereby the contacts can be made to close at the instant the stylus is in any predetermined position with respect to the record paper. It may be noted here that by the use of an irreversible motion transmitting system such as the worm and ring gear shown, the position of the contacts can readily be changed at any time without having to operate any additional locking mechanism. Moreover, a remote control is provided by the flexible shaft so that the adjustment can be made from the outside of the instrument case. However, since all the contacts are mounted on the ring gear 23, all of them will be moved angularly together by this adjustment. For the succeeding depth ranges, therefore, the contacts 37, 40 and 38, 41 must, therefore, be independently angularly adjusted with respect to the contacts 36, 39. This is accomplished by adjusting the relative positions of the segments 27, 28 and 29 by means of the screws 30 to 35. The angular separation between the several sets of contacts can be correctly adjusted during factory assembly and it need not thereafter be disturbed. Zero adjustment for the first depth range will then be effective for all the others.

Upon the member 24 there is mounted a scale 59 by means of the screws 60, 61. The scale carries three sets of graduations 62, 63 and 64. The upper set of graduations 62 is arranged adjacent an index 65 which is fastened to the member 22 and therefore remains fixed in position. The lower sets of graduations 63 and 64 are adjacent an index 66 which is mounted on an arcuate plate 67 which is similar to the contact-carrying plates 27, 28 and 29. It is held on the ring gear 23 by a thumb screw 68 which passes through a slotted hole in the plate 67. The angular position of the plate 67 upon the geared disc 23 and therefore the position of the index 66 with respect to the contacts can be accurately adjusted by a micrometer adjustment. This comprises a post 69 fastened to the plate 67 and having a threaded hole therein adapted to receive an adjusting screw 70 which is freely journaled in another post 71 secured to the ring gear 23. By rotating the screw 70 by means of its knurled head 72 the position of the plate 67 with respect to the contacts is thereby altered. Now it will be observed that rotation of the knob 58 and consequently of the ring gear 23 changes the instant of closing of the various transmitting contacts with respect to the stylus position by an amount in depth units indicated by the index 66 on the scales 63 and 64.

Having properly set the contacts for zero position on the chart, the position of the scale-carrying member 59 is adjusted by loosening the screws 60, 61 until zero of the scale 62 is opposite the index 65. By means of the screw 70 the index 66 is set at the zero mark of scales 63 and 64. With this setting the depth readings on the chart will be in terms of the depth beneath the compressional wave transmitter and receiver.

The record paper 2 is preferably of the type having a carbonized or otherwise electrically conductive body with a thin coating thereon adapted to be discolored or burnt away by the passage of an electric current through the paper. The paper 2 is wound on a spool 80 whence it passes over a roller 81, thence over a marking platen 82 by power supplied by sprocket drum 83 having teeth adapted to engage perforations in the paper, and thence to a take-up spool 84.

The marking stylus itself together with its holder is shown enlarged in elevation in Fig. 3. The stylus 1 which may consist of a steel or other hard, electrically conducting wire is removably held in a clutch or vise 130 controlled by thumb nut 163 which is fixed to an arm 131 pivoted at 132 in a U-shaped bracket 133 which is secured to the rotating arm 3 by the screws 134 (visible in Fig. 2). The stylus end of the arm 131 is urged against the record paper 2 as it travels over the platen 82 by means of a spring 135, the tension of the spring being adjustable by means of the screw 136. The operating circuit for the stylus includes the receiver amplifier 137 which supplies the primary 138 of a voltage step-up transformer. The secondary winding 139 of this transformer has one end grounded, the other end being connected to one stationary contact 140 of a single pole, double-throw relay 141 having a movable contact 142 and an operating coil 143. When the coil 143 is not energized, contacts 140 and 142 are closed. Contact 142 is connected to terminal 144 on the stylus holder through a brush (not shown) which bears against slip ring 145 (Fig. 2). Terminal 144 is connected to the movable stylus arm 131 by the flexible lead 145. The entire stylus holder is completely insulated from the arm 3 by a block 146 of insulating material as shown in Fig. 1. From the stylus 1 the circuit passes through the record paper 2 to the platen 82 and back through ground to the transformer secondary 139. When a reflected signal impulse is received, the amplifier 137 is energized and causes a current impulse to pass from the stylus 1 through the record paper thereby making a mark.

It will be noted that the stylus is mounted at a relatively small angle with the paper surface, namely about 30 degrees. The stylus arm should therefore not be rotated backwards, for if this were done, it would be likely to tear the paper and bend the stylus. Moreover, backward rotation of the contact-operating cam 5 must also be avoided because of the shape of the cut 19 in the cam and of the cam followers which might thereby be broken. To prevent such backward rotation, the shaft 7 has an overrunning clutch 164 mounted on the end of the shaft. The inner element of the clutch is keyed to the shaft 7; while the outer element is fixed to the frame of the instrument. As shown in Fig. 2a the clutch may, for example, be provided with an extending arm 170 which is held in position by screws 168, 167 threaded into ears 166, 169 formed on the back of the gear box 16. This construction is at once effective and simple, since other than the drilling and tapping of the holes for the screws 166, 167, no machine work need be done.

In order to indicate on the record the instant the survey ship passes a predetermined position on its course it is desirable to be able readily to make a distinguishing mark or "fix" on the record paper. For this purpose the operating coil 143 of relay 141 is energized from the battery or other power source 147 by closing the key 148. This causes the movable contact 142 to move toward the relay coil and connect with contact 149 which is connected to battery or other power source 150 and thence to ground. During the transit of the stylus 1 over the record paper, the current, therefore, passes from the stylus through the paper so long as the key 148 is depressed. By this means the stylus can be made to make a mark completely across the paper when the key 148 is closed.

The record provided is illustrated in Fig. 5, where a portion of the record paper 2 is shown, having depth indicia I, of which the first on the left-hand side is the zero depth mark. Outgoing or transmitted pulses are recorded by the stylus 1 at A, while returning echo signals are recorded at B. As a consequence of the advancement of the paper 2 by the sprocket drum 83, repeated marks at A and B are arranged in the general direction of the long dimension of paper, and provide a continuous record. The fix mark F is a continuous mark extending for a length across the paper depending on how long the key 148 is depressed. It may be repeated if the key is held down long enough.

Having now described my invention, I claim:

1. In a depth sounding recorder having a record paper, a stylus adapted when energized by an electric potential to mark the paper and means moving the stylus repeatedly across the paper, means for producing an electric potential in response to the receipt of a signal impulse, means normally connecting said impulse responsive means to said stylus, a potential source, and means under control of the operator for disconnecting said stylus from said impulse responsive means and connecting the stylus to said potential source, whereby a fix mark can be made across the paper.

2. In a depth sounding recorder having a record paper, a stylus adapted when energized by an electric potential to mark the paper and means moving the stylus repeatedly across the paper, means for producing an electric potential in response to the receipt of a signal impulse, means normally connecting said impulse responsive means to said stylus, a potential source, and a keying device under control of the operator for connecting said stylus to said potential source, whereby a fix mark can be made across the paper.

ALBERT E. ANDERSON.

REFERENCES CITED

The following references are of record in the file of this patent:

UNITED STATES PATENTS

| Number | Name | Date |
| --- | --- | --- |
| 613,003 | Andrews | Oct. 25, 1898 |